United States Patent
Nandanwar

(10) Patent No.: US 12,517,568 B2
(45) Date of Patent: Jan. 6, 2026

(54) THERMAL MITIGATION SYSTEMS AND METHODS FOR MULTI-CORE PROCESSORS

(71) Applicant: QUALCOMM INCORPORATED, San Diego, CA (US)

(72) Inventor: Darshan Kumar Nandanwar, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 152 days.

(21) Appl. No.: 18/168,071

(22) Filed: Feb. 13, 2023

(65) Prior Publication Data

US 2024/0272698 A1     Aug. 15, 2024

(51) Int. Cl.
  *G06F 1/324*     (2019.01)
  *G06F 1/3206*    (2019.01)
  *G06F 1/3296*    (2019.01)
  *G06F 11/30*     (2006.01)

(52) U.S. Cl.
  CPC ............ *G06F 1/324* (2013.01); *G06F 1/3206* (2013.01); *G06F 1/3296* (2013.01); *G06F 11/3058* (2013.01)

(58) Field of Classification Search
  CPC ...... G06F 1/324; G06F 1/3206; G06F 1/3296; G06F 1/3058
  USPC ......................................................... 713/300
  See application file for complete search history.

(56) References Cited

U.S. PATENT DOCUMENTS

| | | | | |
|---|---|---|---|---|
| 8,571,847 | B2* | 10/2013 | Cher | G06F 11/24 703/16 |
| 11,460,879 | B1* | 10/2022 | Mehra | G06F 1/324 |
| 2009/0064164 | A1 | 3/2009 | Bose et al. | |
| 2010/0191993 | A1 | 7/2010 | Chaudhry et al. | |
| 2014/0325248 | A1* | 10/2014 | Kim | G06F 13/4234 713/320 |
| 2016/0091949 | A1* | 3/2016 | Buhot | G06F 1/324 713/320 |
| 2016/0124476 | A1 | 5/2016 | Mittal et al. | |
| 2020/0409399 | A1* | 12/2020 | Vangal | G06F 1/3243 |
| 2021/0263773 | A1* | 8/2021 | Shah | G06F 9/4893 |

OTHER PUBLICATIONS

International Search Report and Written Opinion—PCT/US2024/011110—ISA/EPO—Apr. 26, 2024.

* cited by examiner

*Primary Examiner* — Brian T Misiura
(74) *Attorney, Agent, or Firm* — Smith, Tempel, Blaha LLC

(57) ABSTRACT

A system for performing thermal mitigation in a multi-core processor determines which processing core(s) of the processor is responsible for causing the temperature to rise to an undesired level and then performs one or more thermal mitigation steps only in the responsible core to avoid degrading performance of the other cores. The system monitors digital activity (DA) of the pipeline stages of the cores, determines when the DA of a processing stage has caused temperature to rise to a particular level and then reduces the DA of at least one processing stage of the responsible core in order to reduce temperature. The system can also take one or more other thermal mitigation steps based on monitored temperature values, such as reducing clock frequency or selecting a different V/F corner of the responsible core.

16 Claims, 7 Drawing Sheets

EQ1:

$$f(x) = \underbrace{a_n x^n}_{\text{Leading coefficient, Degree}} + \ldots + a_2 x^2 + a_1 x + a_0$$

FIG. 8

THERMAL MITIGATION SYSTEMS AND METHODS FOR MULTI-CORE PROCESSORS

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, portable digital assistant, portable game console, etc. Still other types of PCDs may be included in automotive and Internet-of-Things ("IoT") applications.

The multiple subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Processors of SoCs such as CPUs, GPUs and DSPs, for example, sometimes experience temperature increases due to external environmental factors and/or due to internal factors. Current SoCs employ one or more temperature sensors that sense temperature and output temperatures values. Thermal management circuits employed in the SoC process the temperature values and perform thermal mitigation processes that mitigate these temperature increases.

Current CPUs and GPUs of SoCs are typically multi-core processors have thermal management circuits that perform such thermal mitigation processes. Thermal mitigation is needed when a device starts to overheat. As algorithm complexity, system core frequencies, and levels of integration continually increase, with packaging and form-factor sizes decreasing, thermal mitigation has become increasingly important.

SUMMARY OF THE DISCLOSURE

Systems, methods, and other examples are disclosed for performing thermal mitigation in a multi-core processor.

An exemplary embodiment of the method includes producing at least first and second sets of digital activity (DA) values with at least first and second DA sensors, respectively, disposed in first and second processing cores, respectively, of a multi-core processor. The exemplary method may also include receiving the first and second sets of DA values in a processing unit and processing the first and second sets of DA values in the processing unit to determine whether at least one of the DA values exceeds a DA threshold (TH) value. The exemplary method may also include reducing the digital activity of at least one processing stage of one of the first and second processing cores that is associated with a DA value that exceeded the DA TH value if a determination is made that a DA value exceeds the DA TH value.

An exemplary embodiment of the system includes first and second DA sensors disposed in first and second processing cores, respectively, of a multi-core processor configured to produce first and second sets of DA values, respectively. The system may also include a processing circuit configured to receive the first and second sets of DA values and to process the first and second sets of DA values to determine whether at least one of the DA values exceeds a DA TH value. The processing circuit may also be configured to reduce the digital activity of at least one processing stage of at least one of the first and second processing cores that is associated with a DA value that exceeded the DA TH value if a determination is made that a DA value exceeds the DA TH value.

An exemplary embodiment of a computer-readable medium comprises computer instructions for execution by processing circuit of a multi-core processor for performing thermal mitigation in the multi-core processor. The computer instructions may include a first set of computer instructions for receiving at least first and second sets of DA values produced by first and second DA sensors disposed in first and second processing cores, respectively, of the multi-core processor. The computer-readable medium may also include a second set of instructions for processing the first and second sets of DA values to determine whether at least one of the DA values exceeds a DA TH value. The computer-readable medium may also include a third set of computer instructions for execution by the processing circuit if a determination is made that at least one of the DA values exceeds the DA TH value. Execution of the third set of instructions reduces the digital activity of at least one processing stage of at least one of the first and second processing cores that is associated with the DA value that exceeded the DA TH value.

Another exemplary embodiment of the system may include means for receiving at least first and second sets of DA values produced by first and second DA sensors disposed in first and second processing cores, respectively, of the multi-core processor. The system may also include means for processing the first and second sets of DA values to determine whether at least one of the DA values exceeds a DA TH value. The system may also include means for reducing the digital activity of at least one processing stage of at least one of the first and second processing cores if a determination is made that at least one of the DA values exceeds the DA TH value.

These and other feature and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101a" or "101b", the letter character designations may differentiate two like parts or elements present in the same Figure. Letter character designations for reference numerals may be omitted when it is intended that a reference numeral to encompass all parts having the same reference numeral in all Figures.

FIG. 8 illustrates one of the possible implementation scenarios for the processing logic of each DA sensor to comprise a programmable energy polynomial.

DETAILED DESCRIPTION

Figure 1:
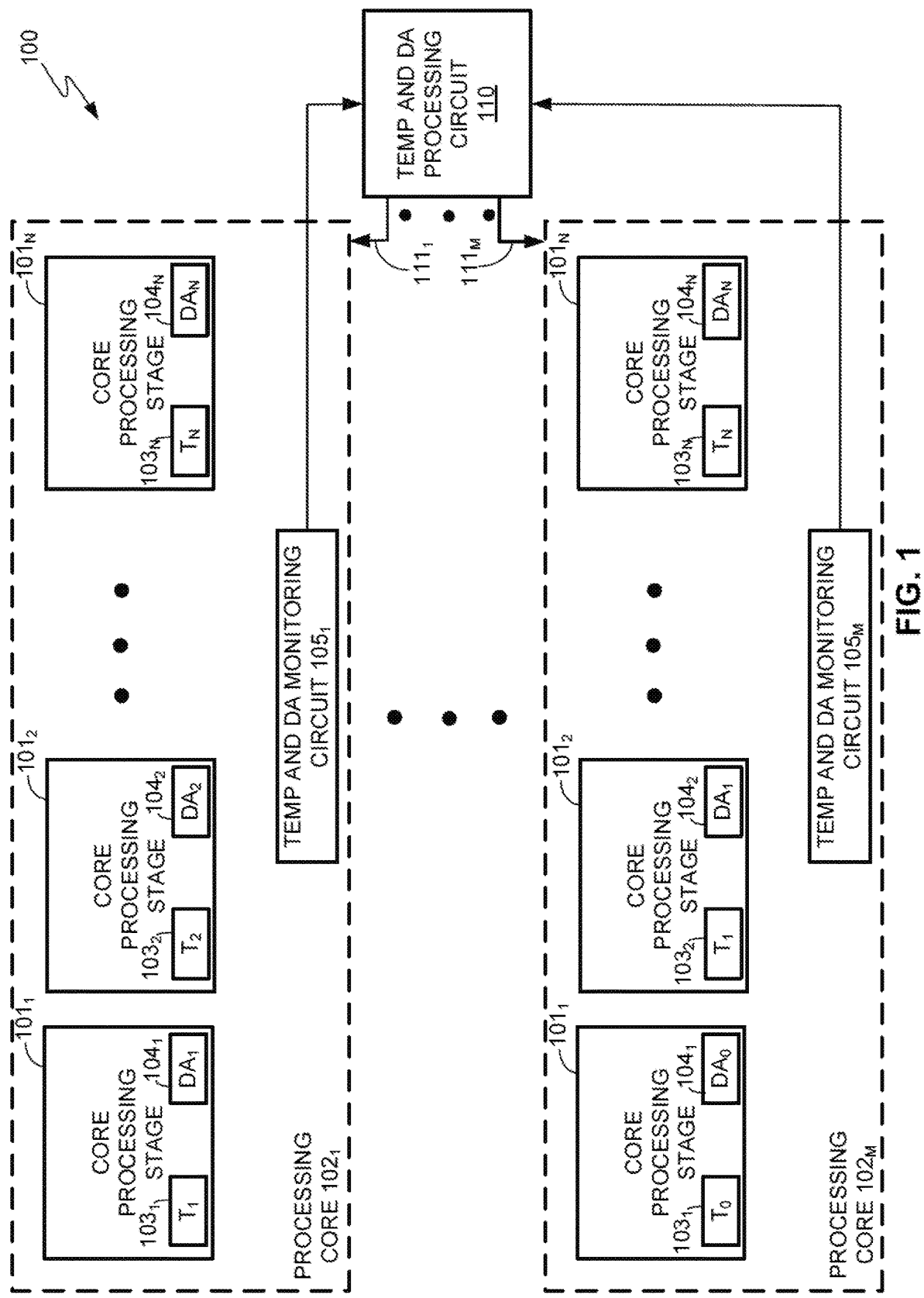
FIG. 1 is a block diagram of a system for performing thermal mitigation in a multi-core processor, in accordance with exemplary embodiments.

The present disclosure discloses systems and methods for performing thermal mitigation in a multi-core processor by determining which processing core(s) of the multi-core processor is responsible for causing the temperature of the processor to rise to an undesired level and then performing one or more thermal mitigation steps only in the responsible core to avoid degrading performance of the other cores. The systems and methods can include monitoring digital activity in the processing stages of the cores and reducing digital activity of at least one of the stages of at least one of the cores if the monitored digital activity exceeds a particular digital activity level.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors. The processor may for instance be a multi-core processor comprising multiple processing cores, each may comprise multiple processing stages of a processing pipeline. A processor may also refer to a collection of processors within a single computer system or distributed amongst multiple computer systems.

A computing device may include multiple subsystems, cores or other components. Such a computing device may be, for example, a PCD, such as a laptop or palmtop computer, a cellular telephone or smartphone, a portable digital assistant, a portable game console, an automotive safety system of an autonomous driving vehicle, etc.

Thermal mitigation schemes in current use can detrimentally impact overall performance. In one implementation of an SoC used in PCDs, first-order and second-order temperature threshold (TH) values are employed in first-order and second-order thermal emergency management circuits, respectively, for processing sensed temperature values. The first-order thermal emergency mitigation circuit is configured to ensure that the SoC makes judicious decisions to achieve a good trade-off between dynamic power (and thus temperature) and performance. The second-order thermal emergency circuit does not take performance into account, as the SoC is operating on a thermal design point (TDP) and it is very critical to immediately reduce the heat flux.

The first-order and second-order TH values are typically programmed to 102° Celsius (C) and 95° C., respectively. If the sensed temperature exceeds the second-order TH value, the thermal emergency mitigation circuit reduces a voltage/frequency (V/F) corner used by the processor in an attempt to reduce the temperature below the second-order TH value. If reducing the V/F corner does not sufficiently mitigate the increase in temperature and the temperature continues to rise until it exceeds the first-order TH value, the thermal emergency mitigation circuit halves the frequency (F/2) of the processor until the temperature drops below the first-order TH value and then reinstates the original frequency.

SoCs typically perform an operating point plan (OPP) that is based on a relationship between supply voltage and operating frequency defined by V/F curves. High-level software running on the SoC votes for one of a plurality of V/F corners to use based on the current computing load. In a typical scenario where T is crossing the second-order TH value by a preselected ΔT magnitude, a lower V/F corner will be used so that SoC operates on a lower frequency and voltage, thereby dynamically reducing power, and thus reducing the heat flux and temperature.

The disadvantage of this type of thermal management solution is that reducing F or the V/F corner can detrimentally impact the performance of other processing cores of the multi-core processor even though the temperature increase may be caused by as few as a single processing stage of a single core. If multiple clock domains are sharing the same power rail, there is no way of uniquely detecting which clock domain is causing the thermal envelope to shoot up in temperature. The thermal mitigation applies to all of the clock domains belonging to the shared rail, which results in all of the cores being penalized, even those that have moderate loads. Therefore, overall performance is detrimentally impacted.

The present disclosure provides a thermal management solution that overcomes these disadvantages, as will now be described with reference to the exemplary embodiments shown in FIGS. 1-7.

FIG. 1 is a block diagram of a system 100 in accordance with a representative embodiment that can be embedded in a multi-core processor of the type typically employed in SoCs of PCDs, such as in CPUs, GPUs and DSPs, for example, although the inventive principles and concepts are not limited in regard to the types of multi-core processors in which the inventive principles and concepts are employed. The inventive principles and concepts also are not limited in regard to where the system 100 is located. For example, a portion of the system 100 can be embedded inside of the multi-core processor and a portion of the system 100 can be external to the multi-core processor, such as in logic that is external to the multi-core processor, but located on the same SoC as the multi-core processor.

In accordance with the representative embodiment of the system 100 shown in FIG. 1, each core processing stage $101_1$-$101_N$ of each core $102_1$-$102_M$ comprises, in addition to its normal logical configuration, a temperature sensor $103_1$-$103_N$ and a digital activity (DA) sensor $104_1$-$104_N$, where N and M are positive integers that are greater than or equal to one and typically are greater than or equal to two. For example, a typical data processing pipeline of a processing core of a multi-core processor includes six processing stages, namely, an instruction fetch unit (IF), a decoding unit (DU), a reservation station unit (RSU), an execution unit (EU), a floating point unit (FPU), and a reorder buffer unit (ROBU). For ease of discussion, it will be assumed that each of the cores $102_1$-$102_M$ comprises these six stages, although it should be understood that the inventive principles and concepts can be applied to any type of processing pipeline regardless of the types of stages that are used in the pipeline.

Each temperature sensor $103_1$-$103_N$ is configured to sense temperatures of the respective processing stages $101_1$-$101_N$ and to output respective temperature values indicative of the respective sensed temperatures. The DA sensors $104_1$-$104_N$ are configured to sense digital activity of the respective processing stages $101_1$-$101_N$ and to output respective DA values indicative of the sensed digital activity. Each of the processing cores $102_1$-$102_M$ preferably has a TEMP and DA monitoring circuit $105_1$-$105_M$ disposed on it that is configured to monitor the temperature and DA values sensed by the respective sensors $103_1$-$103_N$ and $104_1$-$104_N$.

It should be noted that although the TEMP and DA monitoring circuits $105_1$-$105_M$ are shown in FIG. 1 as being disposed on the respective cores $102_1$-$102_M$, they could be external to the respective cores $102_0$-$102_N$. It should also be noted that although each core processing stage $101_1$-$101_N$ is shown in FIG. 1 as having a temperature sensor $103_1$-$103_N$ and a DA sensor $104_1$-$104_N$, as few as a single one of the core processing stages $101_1$-$101_N$ of each core $102_1$-$102_N$ can have one of the temperature sensors $103_1$-$103_N$ and one of the DA sensors $104_1$-$104_N$ disposed on it, as will be discussed below in more detail with reference to FIG. 2. For ease of discussion, it will be assumed that every processing stage $101_1$-$101_N$ of every core $102_1$-$102_N$ has one of the temperature sensors $103_1$-$103_N$ and one of the DA sensors $104_1$-$104_N$ disposed on it.

The TEMP and DA monitoring circuits $105_1$-$105_M$ receive the temperature and DA values from the core processing stages $101_1$-$101_N$ of the respective cores $102_1$-$102_M$ and forward them along with processing core identifiers to the TEMP and DA processing circuit 110. The core identifiers identify the processing cores $102_1$-$102_M$ with which the temperature and DA values are associated and the stage identifiers identify the processing stages $101_1$-$101_N$ in which the temperature and DA values were sensed. The TEMP and DA processing circuit 110 is configured to process the temperature values, the DA values and the identifiers to generate thermal mitigation control signals $111_1$-$111_M$ for controlling thermal mitigation in the cores $102_1$-$102_N$ based on the temperature and DA values, as will be discussed below in more detail.

Generally, the control signals $111_1$-$111_M$ cause one or both of (1) a reduction in the clock frequency of at least one of the stages $101_1$-$101_N$ of at least one of the cores $102_1$-$102_M$ that the TEMP and DA processing circuit 110 determines is responsible for a temperature increase to a level that exceeds one or more TH values, and (2) a reduction in the digital activity of at least one of the stages $101_1$-$101_N$ of at least one of the cores $102_1$-$102_M$ that the TEMP and DA processing circuit 110 determines is responsible for a temperature increase to a level that exceeds one or more TH values. A reduction in clock frequency can detrimentally impact performance for all processing cores that are sharing the same clock domain, and therefore it is preferable to reduce digital activity by throttling instruction execution. This can be achieved by, for example, inserting idle instructions into whichever of the processing stages $101_1$-$101_N$ of the responsible core $102_1$-$102_M$ is the EU stage.

The DA sensors $104_1$-$104_N$ can detect digital activity of the processing stages $101_1$-$101_N$ in a number of ways, as will be discussed below in more detail with reference to FIG. 2. One way to assess digital activity is to base it on the number and/or types of instructions that are being executed by one or more of the stages $101_1$-$101_N$. At any given instant in time, some of the stages $101_1$-$101_N$ will be more active than others in terms of instruction execution, and the more active a stage is, the more power that stage consumes, and consequently, the more that stage contributes to an increase in the temperature of the respective core $102_1$-$102_M$. In addition, an increase in the temperature of one of the cores $102_1$-$102_M$ can lead to an increase in the temperature of adjacent cores $102_1$-$102_M$. The DA sensors $104_1$-$104_N$ sense the level of digital activity and generate corresponding DA values.

The total power, $P_{total}$, dissipated in a processing stage $101_1$-$101_N$ can be expressed as the sum of the dynamic power usage, $P_{dynamic}$, and power leakage, $P_{leakage}$:

$$P_{total} = P_{dynamic} + P_{leakage}$$

$$P_{total} = \alpha C V_{dd}^2 f + V_{dd} I_{leakage}$$

The dynamic power $P_{dynamic}$ is generally the power consumed by switching during instruction execution and can be expressed as $\alpha C V_{dd}^2 f$, where $\alpha$ is the fraction of the clock cycle when the gate switches, C is the dynamic capacitance associated with the switching, f is the clock frequency of the stage $101_1$-$101_N$, and $V_{dd}$ is the supply voltage of the stage $101_1$-$101_N$. In accordance with a representative embodiment, each of the DA sensors $104_1$-$104_N$ comprises a combination of a dynamic capacitance sensor and processing logic of the respective core processing stage $101^1$-$101^N$ associated with the respective DA sensor $104^1$-$104^N$.

A typical CPU instruction-set-architecture has millions of various categories of instruction(s) and every category of instructions is used for a different purpose throughout the software application programs. Therefore, digital activity of these instructions will vary based on which stage of the pipelines they are in and what other categories of instructions are occupied at other pipeline stages at given sample windows of the DA sensors $104^1$-$104^N$.

One of the possible implementation scenarios is for the processing logic of each DA sensor $104^1$-$104^N$ to comprise a programmable energy polynomial as illustrated in FIG. 8 which lists Equation 1 (EQ1). In EQ1, $a_0$, $a_1$, $a_2$ ... $a_n$ are energy coefficients having weightage assigned based on the categories of the event in the sample window of the processor pipeline, an is the energy coefficient of the $n^{th}$ category of instructions in the pipeline, and x identifies the stage of the pipeline comprising the instructions. The values of x and an are programmable and are programmed with default values that may require pre-processing characterization in order to achieve optimal DA sensing. CPU instructions may generate events at every pipeline stage that are given to the DA sensors $104_1$-$104_N$, which use the programmed energy coefficient and event type to derive the DA value at given sample window. It should be noted, however, that other methods of assessing DA can be used for this purpose.

Dynamic Capacitance can be calculated as the polynomial equation set forth above where the polynomial order and the coefficients are weighted by the events produced by the instructions executing in different stages of the pipeline. As indicated above, the coefficients and order can be programmed for customized events or hard wired. This is one feasible low-cost solution for obtaining the dynamic capacitance at runtime, but others are possible. Therefore, the inventive principles and concepts are not limited to this solution for obtaining the DA values. Many other solutions for this purpose can be devised, as will be apparent to those of skill in the art in view of the present disclosure.

In general, and as will be described below in more detail, the TEMP and DA processing circuit 110 processes the DA values, the associated temperature values, and the associated core identifiers to determine which of the core(s) $102_1$-$102_M$, and preferably which of the stage(s) $101_1$-$101_N$ within the core(s), is responsible for the increase in temperature beyond some chosen or programmed TH level. The TEMP and DA processing circuit 110 then generates the thermal mitigation control signals $111_1$-$111_M$ for controlling thermal mitigation in the cores $102_1$-$102_N$ based on the sensed temperature and DA values.

Figure 2:
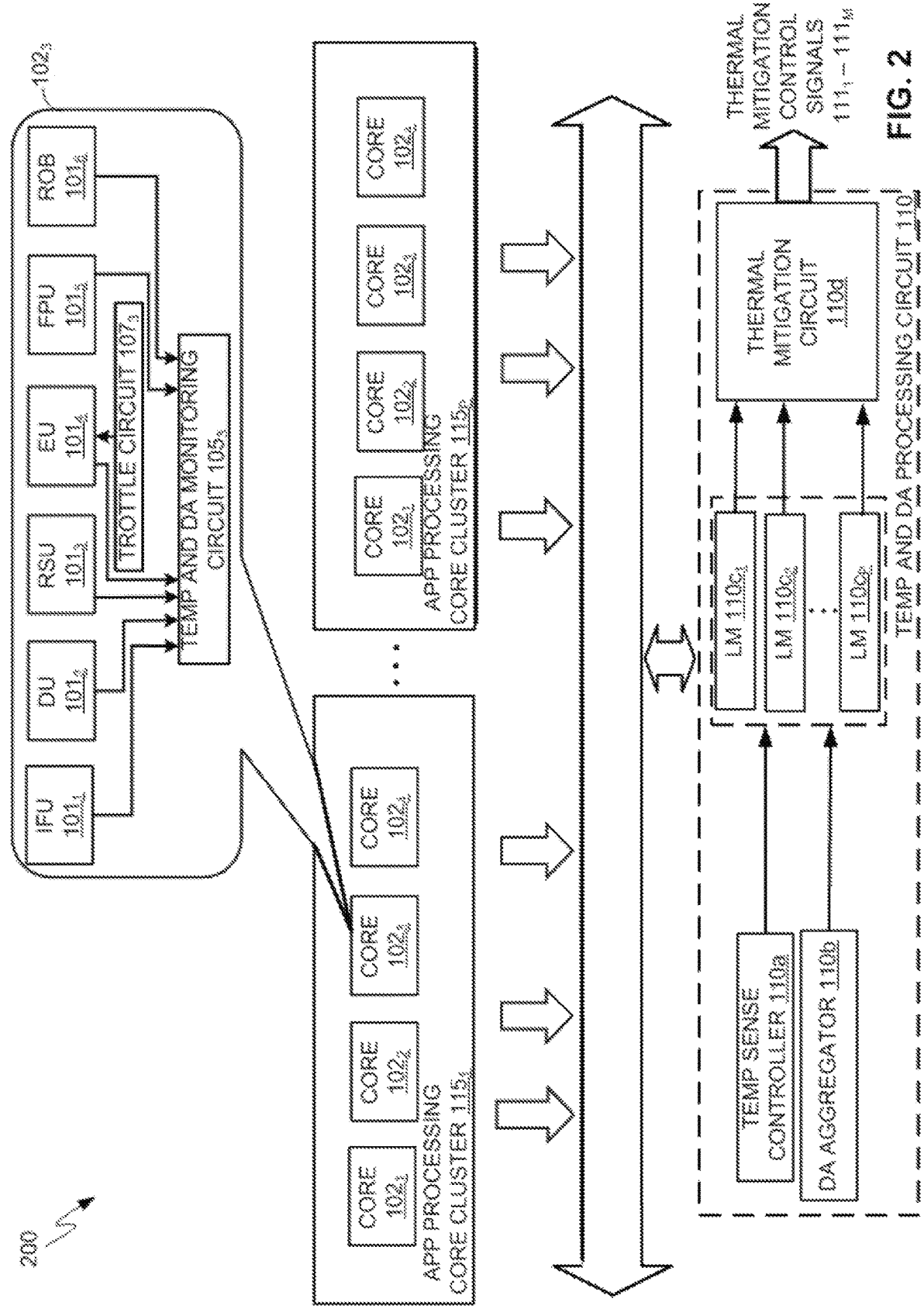
FIG. 2 is a block diagram of another system for performing thermal mitigation in a multi-core processor, in accordance with exemplary embodiments.

FIG. 2 is a block diagram of the system 200 in accordance with a representative embodiment in which the system 200 is used to manage thermal mitigation in a multi-core processor comprising P application processing core clusters $115_1$-$115_P$, where P is a positive integer that is greater than or equal to one. In this example, two application processing core clusters are shown, namely, core cluster $115_1$ and core cluster $115_P$. FIG. 2 also shows an expanded view of one of the cores $102_3$ of core cluster $115_1$. In this example, each cluster $115_1$-$115_P$ has four cores $102_1$-$102_4$ and each core has a known processing pipeline configuration made up of six processing stages, namely, IFU $101_1$, DI $101_2$, RSU $101_3$, EU $101_4$, FPU $101_5$ and ROBU $101_6$.

Each core $102_1$-$102_4$ of each cluster $115_1$-$115_P$ also includes an instance of the TEMP and DA monitoring circuit $105_1$-$105_M$. In addition, each core $102_1$-$102_4$ of each cluster $115_1$-$115_P$ also includes an instance of a throttle circuit $107_1$-$107_4$. The throttle circuits $107_1$-$107_4$ perform the function described above of reducing the digital activity of at least the EU stage $101_4$ of at least one of the cores $102_1$-$102_4$ that the TEMP and DA processing circuit 110 determines is responsible for a temperature increase to a level that exceeds one or more TH values. Digital activity can be reduced in a number of ways, such as, for example, by inserting idle instruction cycles into the processing pipeline, which reduces instructions per cycle in a given sample period, which, in turn, reduces dynamic energy and thus temperature.

In accordance with the representative embodiment of the system 200 shown in FIG. 2, the TEMP and DA processing circuit 110 comprises a temperature sense controller 110a, a DA aggregator 110b, P limit managers (LMs) $110c_1$-$110c_P$, and a thermal mitigation circuit 110d. The cores $102_1$-$102_4$ of all of the clusters $115_1$-$115_P$ communicate with the TEMP and DA processing circuit 110 via a bus 117 over which the temp and DA values as well as the stage and core identifiers are transported to the temperature sense controller 110a and to the DA aggregator 110b.

In accordance with this representative embodiment, each of the LMs $110c_1$-$110c_P$ handles limit management for a respective one of the core clusters $115_1$-$115_P$. As will be described below in more detail with reference to FIG. 3, each of the LMs $110c_1$-$110c_P$ compares first-order and second-order temperature TH values to the temperature values received by the temperature sense controller 110a from cores of the clusters $115_1$-$115_P$, respectively, and forwards the results to a thermal mitigation circuit 110d.

In accordance with this representative embodiment, the DA aggregator 110b determines, for each core, the maximum DA value for each sampling window and forwards the maximum DA values to the LMs $110c_1$-$110c_P$. Each of the LMs $110c_1$-$110c_P$ compares a DA TH value to the maximum DA values of cores of the respective clusters $115_1$-$115_P$ and forwards the results to the thermal mitigation circuit 110d. Preferably, all of the TH values used by the LMs $110c_1$-$110c_P$ are programmable to allow them to be set and changed as desired. Having separate LMs is not required, but doing so allows them to be operated on in parallel and to have one per power domain so that they can have power domain independence.

The thermal mitigation circuit 110d receives the results of the comparisons from the LMs $110c_1$-$110c_P$ as well as the core identifiers associated with the temperature and DA values and generates the thermal mitigation control signals $111_1$-$111_M$ based on the results and the associated core identifiers. The thermal mitigation control signals $111_1$-$111_M$ control the throttle circuits $107_1$-$107_M$ to cause them to reduce the digital activity of the core(s) $102_1$-$102_M$ responsible for the temperature increase. As indicated above, reducing digital activity can mean, for example, reducing digital activity of a single stage, such as that of the EU stage $101_4$ since it typically is the most digitally active stage of the core.

Figure 3:
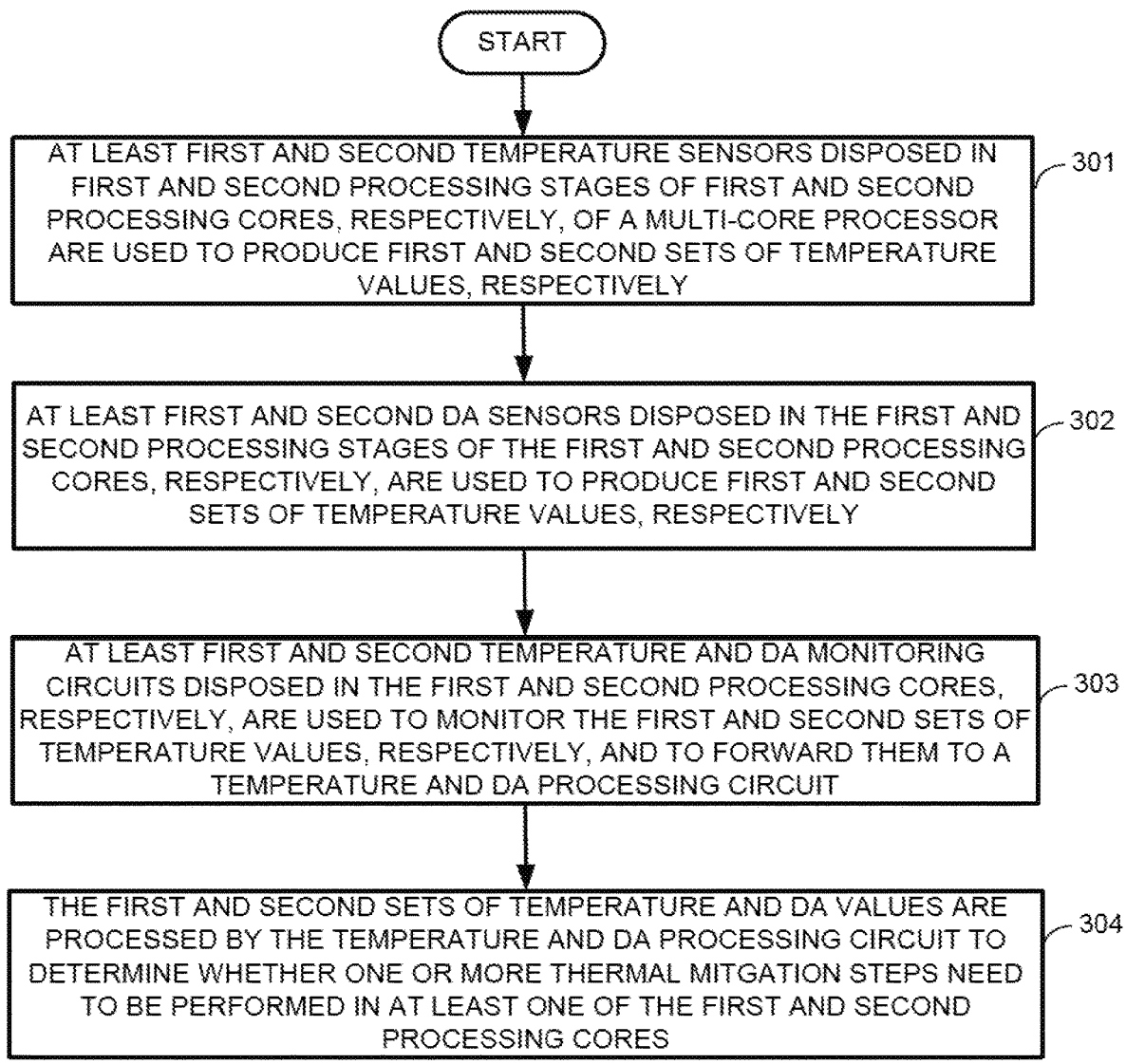
FIG. 3 is a flow diagram illustrating a method for performing thermal mitigation in a multi-core processor, in accordance with exemplary embodiments.

FIG. 3 is a flow diagram of the method for performing thermal mitigation in a multi-core processor in accordance with a representative embodiment. At least first and second temperature sensors disposed in first and second processing stages, respectively, of first and second data processing pipelines, respectively, of first and second processing cores, respectively, are used to sense first and second sets of temperature values, respectively, as indicated by block 301. At least first and second DA sensors disposed in the first and second data processing stages, respectively, are used to sense first and second sets of DA values, respectively, as indicated by block 302. First and second temperature and DA monitoring circuits disposed on the first and second processing cores, respectively, are used to monitor the first and second sets of temperature and DA values, respectively, and to forward them to a temperature and DA processing circuit, as indicated by block 303. The first and second sets of temperature and DA values are received and processed in a temperature and DAF processing circuit to determine whether one or more thermal mitigation steps need to be performed in at least one of the first processing core and the second processing core, as indicated by block 304.

It should be noted that a number of modifications can be made to the process represented by the flow diagram of FIG. 3, i.e., steps not shown can be added and steps that are shown can be deleted or modified.

Figure 4:
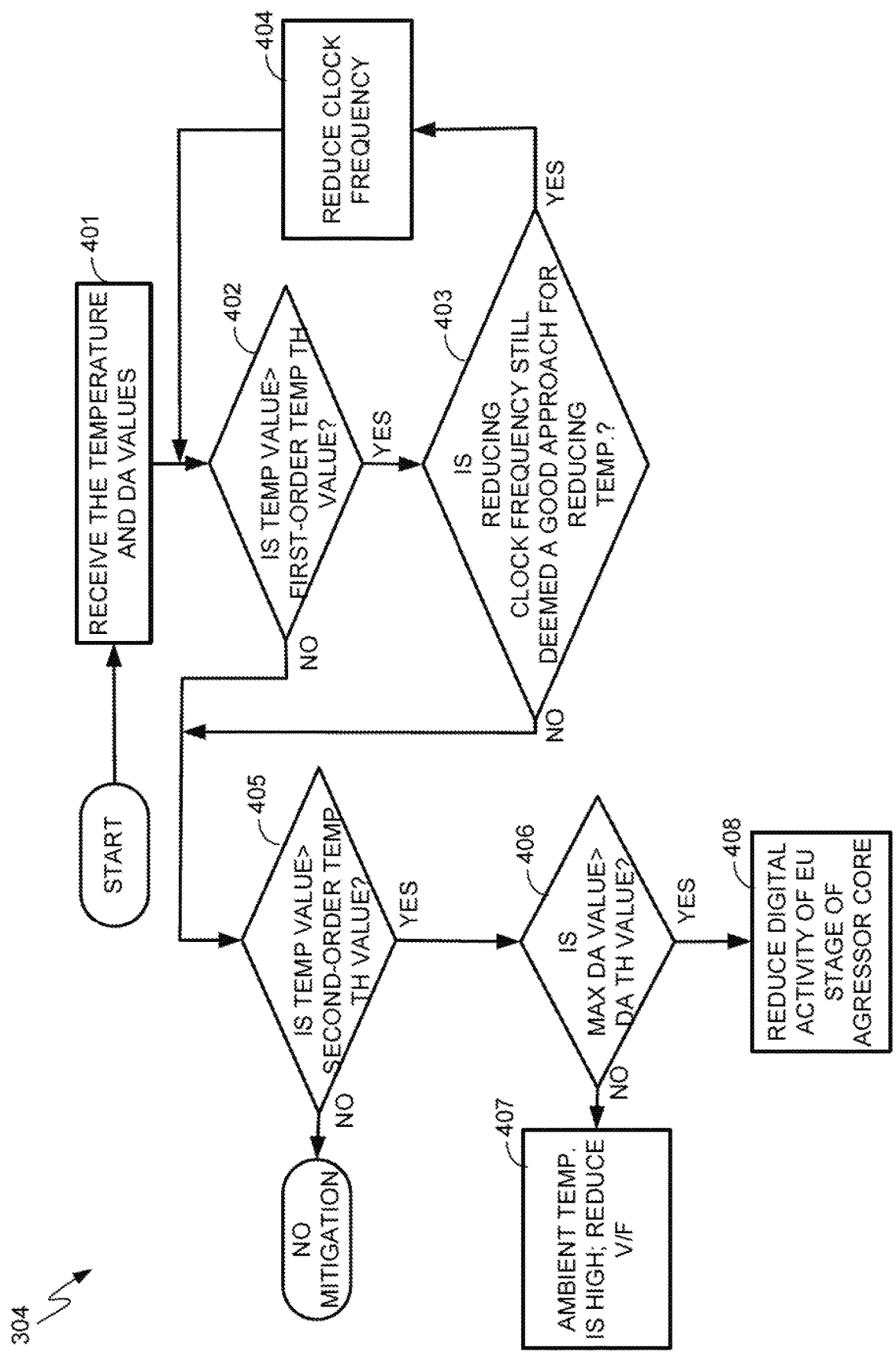
FIG. 4 is a flow diagram illustrating of another method for performing thermal mitigation in a multi-core processor, in accordance with exemplary embodiments.

FIG. 4 is a flow diagram of the method corresponding to block 304 of FIG. 3 for processing the temperature and DA values in the TEMP and DA processing circuit 110 in accordance with a representative embodiment. The temperature and DA values are received in the TEMP and DA processing circuit 110, as indicated by block 401. The TEMP and DA processing circuit 110 compares each temperature value to a first-order TH value to determine whether or not the temperature value exceeds the first-order temperature TH value, as indicated by block 402. If so, a determination is made at block 403 as to whether a reduction in clock frequency is deemed a good approach for mitigating temperature, and if so, block 404 represents the TEMP and DA value processing circuit 110 generating thermal mitigation control signals $111_1$-$111_M$ that cause the clock frequency of the core that is responsible for the temperature increase to be reduced (e.g., f/2).

As indicated above, reducing the clock frequency may not always be sufficient to mitigate the temperature increase, in which case other thermal mitigation steps may need to be taken. For example, the clock frequency of the core may have already been reduced to the point where performance is suffering and yet the temperature has not dropped significantly. Block 403 represents the step of determining whether further reducing the clock frequency remains a good approach for reducing temperature. A variety of factors may be taken into consideration in making this determination, such as the number of times the clock frequency has already been halved and/or whether the previous reduction in clock frequency has resulted in a significant drop in temperature. If the temperature increase is caused by external environmental factors, for example, further reductions in clock frequency will likely not bring the temperature of the core down to a desired level.

If it is determined at block 403 that reducing the clock frequency of the core remains a good approach, the clock frequency is reduced at block 404 and the process returns to block 402 at which a determination is made as to whether the most recent reduction in the clock frequency has resulted in the current temperature value being lower than the first-order temperature TH value. If not, the process remains in the loop comprising blocks 402-404 until either the current temperature value drops below the first-order temperature TH value or it is determined at block 403 that further reducing the clock frequency is not a good or viable solution for reducing the temperature of the core.

Once a determination is made at block 402 that the current temperature value no longer exceeds the first-order temperature TH value or a determination is made at block 403 that further reductions in clock frequency should not be made, the process moves to block 405 at which a determination is made as to whether the current temperature value exceeds the second-order temperature TH value. If not, no thermal mitigation steps are performed. If so, a determination is made at block 406 of whether or not the max DA value of the core exceeds the DA TH value. If not, the temperature increase is deemed to be due to the external ambient temperature and V/F is reduced, as indicated by block 407. It should be noted that the steps represented by blocks 401, 402, 404 and 407 are currently performed in known thermal mitigation processes, as described above in the Background, but the known processes do not take digital activity into account in determining whether thermal mitigation steps need to be performed.

If a determination is made at block 406 that the maximum DA value exceeds the DA TH value, the process moves to block 408, which represents the process of the thermal mitigation control signals $111_1$-$111_M$ produced by the thermal mitigation circuit 110d of the TEMP and DA processing circuit 110 causing the digital activity of one of the stages (e.g., FIG. 3, the EU stage $101_4$) to be reduced. The process preferably returns to block 406 to determine whether or not the most recent reduction in digital activity has caused the current maximum DA value to drop below the DA TH value. The loop comprising blocks 406 and 408 can continue until a determination is made at block 406 that the maximum DA value no longer exceeds the DA TH value, or that loop can be performed a preselected number of times before the process ends, starts over or returns to some other step shown in FIG. 4.

It should be noted that a number of modifications can be made to the process represented by the flow diagram of FIG. 4, i.e., steps not shown can be added and steps that are shown can be deleted or modified. For example, in some embodiments, blocks 401-405 can be part of some other process or can be deleted, leaving the process represented by blocks 406-408 to be performed as a separate, independent thermal mitigation process. For example, a process comprising blocks 401-405 could be performed as a separate process that triggers the performance of the process represented by the loop comprising blocks 405-408 only if "No" is the answer to the question posed at blocks 402 or 403.

Figure 5:
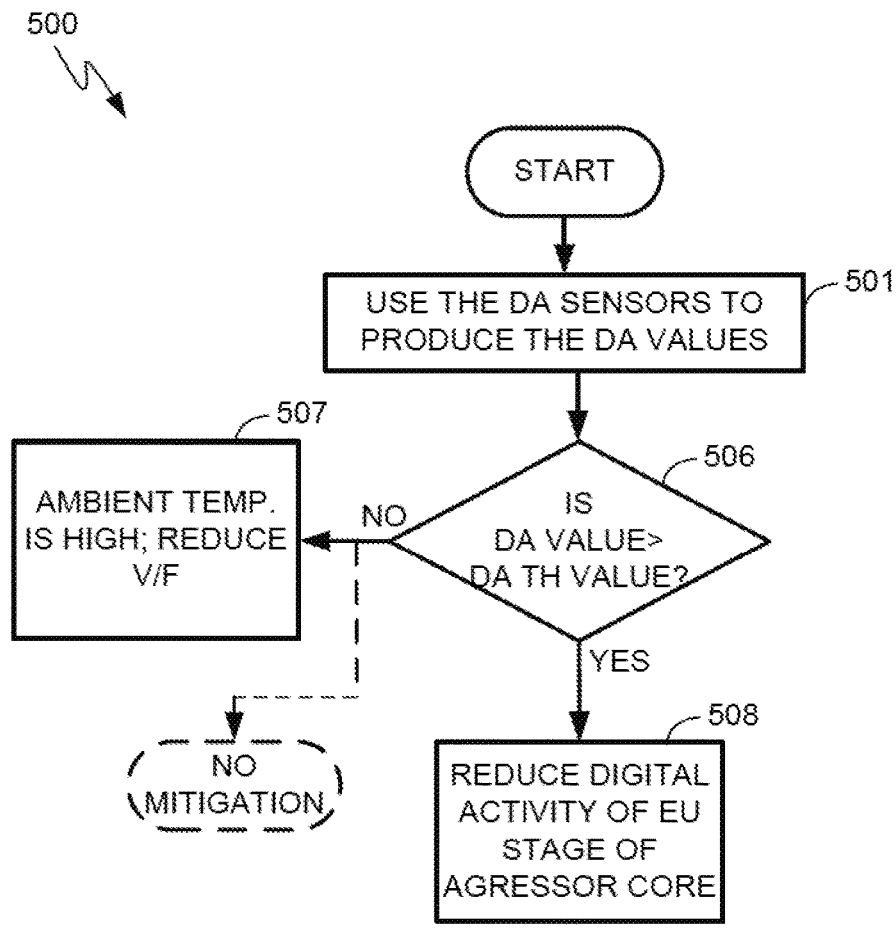
FIG. 5 is a flow diagram illustrating of another method for performing thermal mitigation in a multi-core processor, in accordance with exemplary embodiments.

FIG. 5 shows a flow diagram comprising the blocks 407-408 of FIG. 4 relabeled as blocks 507-508, respectively. The process 500 represented by the flow diagram of FIG. 5 can be a stand-alone thermal mitigation process or it can be used with the process represented by blocks 401-405 shown in FIG. 4 in the manner described above. For exemplary purposes, the process represented by FIG. 5 will be described as a stand-alone thermal mitigation process performed by the system 600 shown in FIG. 6, which can be part of a multicore processor of an SoC, such as an SoC of a PCD, for example.

Figure 6:
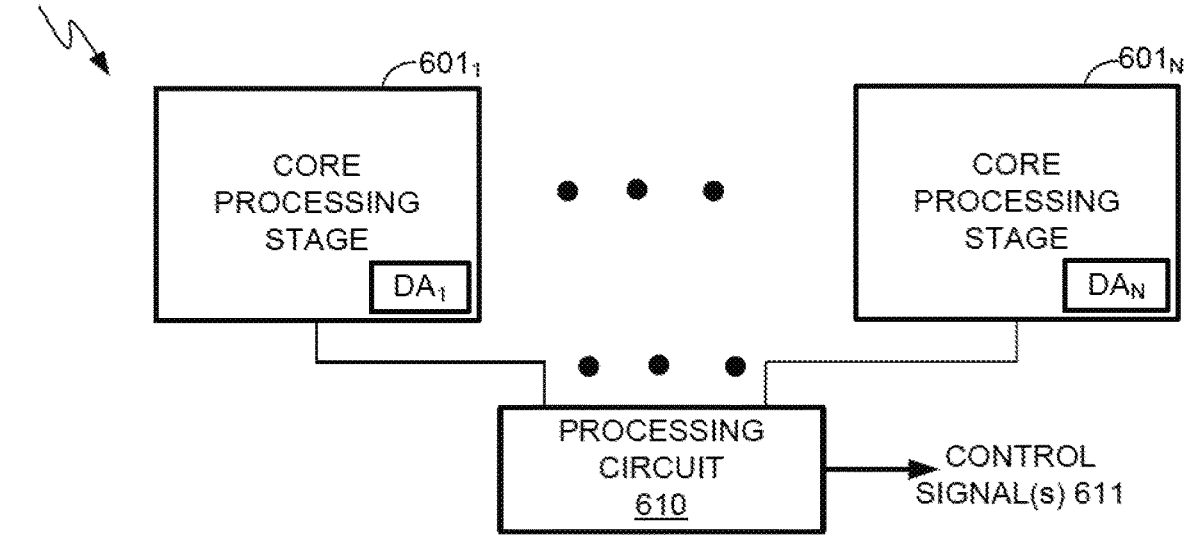
FIG. 6 is a block diagram of a system for performing thermal mitigation in a multi-core processor, in accordance with exemplary embodiments.

Block 501 of FIG. 5 represents the DA sensors of the processing core stages $601_1$-$601_N$ of the system 600 shown in FIG. 6 producing the DA values, which are received in the processing circuit 610 shown in FIG. 6. The processing core stages $601_1$-$601_N$ shown in FIG. 6 can be processing stages of the same core or different cores. Block 506 of FIG. 5 represents the process performed by the processing circuit 610 of FIG. 6 to determine whether one of the DA values exceeds the DA TH value. The DA value that is compared to the DA TH value can be the maximum DA value determined after the aforementioned aggregation process, or alternatively each DA value can be compared to the DA TH value.

If the processing circuit 610 does not find that the DA value exceeds the DA TH value, this can mean that the higher temperature is due to high ambient temperature. In one embodiment, this can mean that a reduced V/F corner should be used to reduce temperature, or alternatively, that no thermal mitigation is needed, depending on the manner in which the process is implemented. If the processing circuit 610 determines that the DA value exceeds the DA TH value, it sends one or more control signals 611 to the stage associated with the DA value, as indicated by block 508 of FIG. 5.

Figure 7:
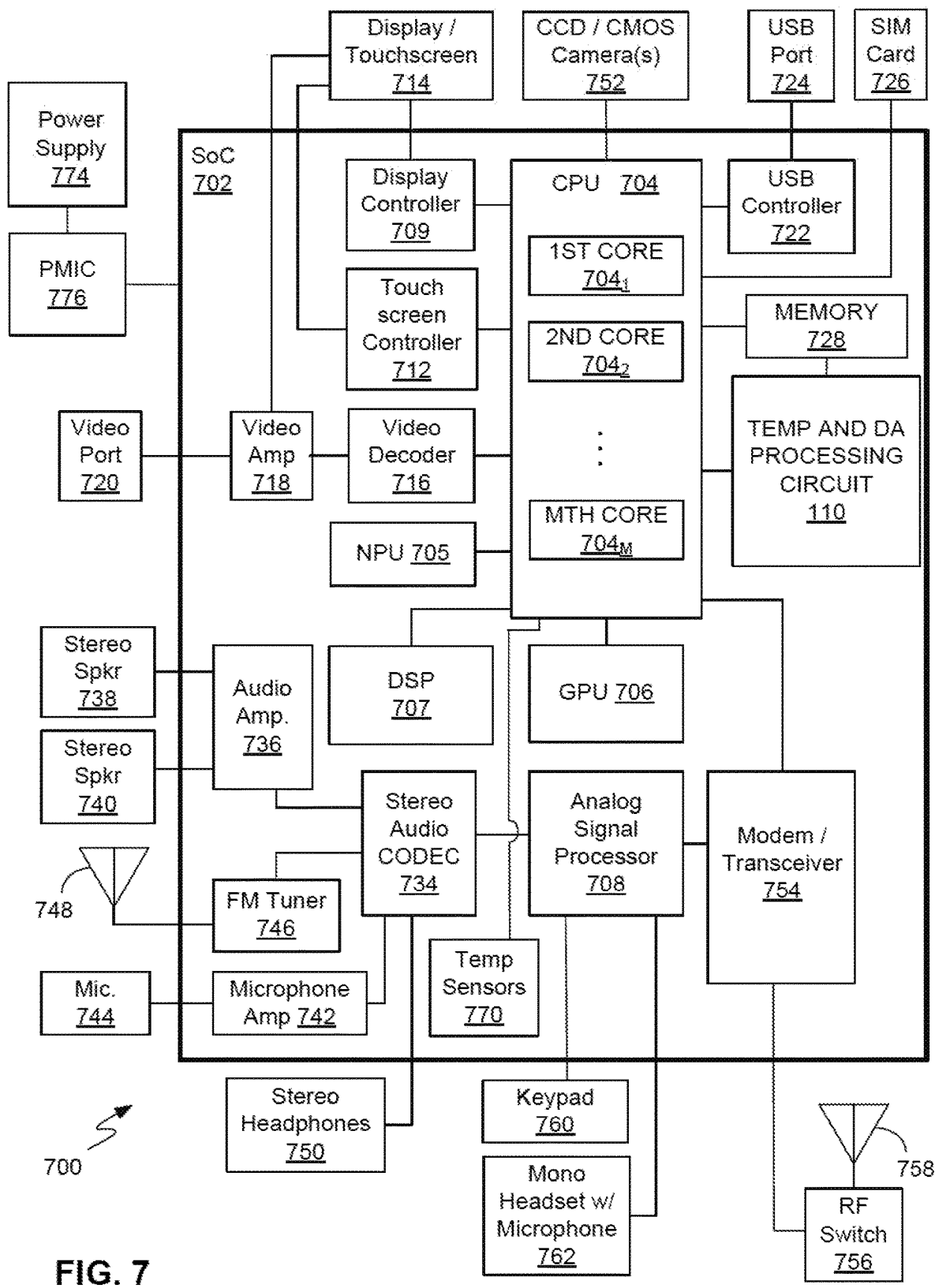
FIG. 7 is a block diagram of PCD comprising a system-on-a-chip (SoC) that can incorporate the systems shown in FIGS. 1, 2 and 6 for performing thermal mitigation in a multi-core processor, in accordance with exemplary embodiments.

FIG. 7 illustrates an example of a PCD 700, such as a mobile phone, a smartphone, a portable game console such as an Extended Reality (XR) device, a Virtual Reality (VR) device, an Augmented Reality (AR) device, or a Mixed Reality (MR) device, an automotive autonomous driving system, etc., in which exemplary embodiments of systems, methods, computer-readable media, and other examples of providing the thermal mitigation solution according to the inventive principles and concepts may be implemented. For purposes of clarity, some interconnects, signals, etc., are not shown in FIG. 7.

The PCD 700 may include an SoC 702. The SoC 702 may include a CPU 704, an NPU 705, a GPU 706, a DSP 707, an analog signal processor 708, a modem/modem subsystem 754, or other processors. The CPU 704 may include one or more CPU cores, such as a first CPU core $704_1$, a second CPU core $704_2$, etc., through an $M^{th}$ CPU core $704_M$.

The cores $704_1$-$704_M$ may be configured in the manner described above with reference to FIGS. 1, 2 and 6 to perform the operations described above of the thermal mitigation system and method of the present disclosure. The CPU cores $704_1$-$504_M$ also perform other operations of the type that they normally perform in a PCD. Alternatively, or in addition, any of the processors, such as the NPU 705, GPU 706, DSP 707, etc., may have cores that are configured in the manner described above with reference to FIGS. 1, 2 and 6 to perform the operations described above of the thermal mitigation system and method of the present disclosure.

A display controller 709 and a touch-screen controller 712 may be coupled to the CPU 704. A touchscreen display 714 external to the SoC 702 may be coupled to the display controller 710 and the touch-screen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A universal serial bus ("USB") controller 722 may also be coupled to CPU 704, and a USB port 724 may be coupled to the USB controller 722. A subscriber identity module ("SIM") card 726 may also be coupled to the CPU 704.

One or more memories 728 may be coupled to the CPU 704. The one or more memories 704 may include both volatile and non-volatile memories. Examples of volatile memories include static random access memory ("SRAM") and dynamic random access memory ("DRAM"). Such memories may be external to the SoC 702 or internal to the SoC 702. The one or more memories 728 may include local cache memory or a system-level cache memory.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Examples of other devices that may be coupled to the CPU 704 include one or more digital (e.g., CCD or CMOS) cameras 752.

A modem or RF transceiver 754 may be coupled to the analog signal processor 708 and the CPU 704. An RF switch 756 may be coupled to the RF transceiver 754 and an RF antenna 758. In addition, a keypad 760 and a mono headset with a microphone 762 may be coupled to the analog signal processor 708. The SoC 702 can have one or more internal or on-chip thermal sensors 770 in addition to the thermal sensors that are located in or near the cores $704_1$-$704_M$. A power supply 774 and a PMIC 776 may supply power to the SoC 702.

Firmware or software may be stored in any of the above-described memories, or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for performing thermal mitigation in a multi-core processor, comprising:
   with at least first and second digital activity (DA) sensors disposed in first and second processing cores, respectively, of the multi-core processor, producing first and second sets of DA values, respectively; and
   in a processing circuit, receiving the first and second sets of DA values and processing the first and second sets of DA values to determine whether at least one of the DA values exceeds a DA threshold (TH) value, wherein if a determination is made that at least one of the DA values exceeds the DA TH value, reducing the digital activity of at least one processing stage of one of the first and second processing cores that is associated with the DA value that exceeded the DA TH value.
2. The method of clause 1, further comprising:
   with first and second temperature sensors disposed in first and second processing cores, respectively, of the multi-core processor, producing first and second sets of temperature values, respectively;
   in the processing circuit, receiving the first and second sets of temperature values and processing the first and second sets of temperature to determine whether one or more thermal mitigation steps need to be performed in at least one of the first processing core and the second processing core.
3. The method of clause 2, wherein processing the first and second sets of temperature values in the processing circuit comprises:

prior to processing the first and second sets of DA values in the processing circuit to determine whether at least one of the DA values exceeds the DA TH value:

comparing each temperature value to a first-order temperature TH value to determine whether any of the temperature values exceeds the first-order temperature TH value; and if a determination is made that at least one of the temperature values of the first set of temperature values exceeds the first-order temperature TH value, reducing a clock frequency of the first processing core, and if it is determined that at least one of the temperature values of the second set of temperature values exceeds the first-order temperature TH value, reducing a clock frequency of the second processing core.

4. The method of clause 3, wherein the processing of the first and second sets of temperature and DA values in the processing circuit further comprises:

prior to processing the first and second sets of DA values to determine whether at least one of the DA values exceeds a DA TH value:

if a determination is made that a temperature value compared to the first-order temperature TH value does not exceed the first-order temperature TH value, comparing the temperature value that did not exceed the first-order temperature TH value to a second-order temperature TH value that is less than the first-order temperature TH value.

5. The method of clause 4, wherein the step of processing the first and second sets of DA values to determine whether at least one of the DA values exceeds a DA TH value comprises:

aggregating the DA values and determining first and second maximum DA values of the first and second sets of DA values, respectively;

if the temperature value compared to the second-order temperature TH value is of the first set of temperature values and exceeds the second-order temperature TH value, comparing the first maximum DA value to a DA TH value;

if a determination is made that the first maximum DA value exceeds the DA TH value, reducing a digital activity of at least a first processing stage of the first processing core;

if the temperature value compared to the second-order temperature TH value is of the second set of temperature values and exceeds the second-order temperature TH value, comparing the second maximum DA value to the DA TH value; and if a determination is made that the second maximum DA value exceeds the DA TH value, reducing the digital activity of at least a second processing stage of the second processing core.

6. The method of clause 5, wherein the first processing stage of the first processing core is an execution unit (EU) processing stage, and wherein the digital activity of the EU processing stage is reduced by reducing a number of instructions per cycle (IPCs) that are executed by the EU processing stage.

7. The method of clause 5, wherein the second processing stage of the second processing core is an execution unit (EU) processing stage, and wherein the digital activity of the EU processing stage is reduced by reducing a number of instructions per cycle (IPCs) that are executed by EU processing stage.

8. The method of any of clauses 5 through 7, further comprising:

if it is determined that the first maximum DA value does not exceed the DA TH value, reducing a supply voltage/clock frequency (V/F) corner used by the first processing core.

9. The method of any of clauses 5 through 8, further comprising:

if it is determined that the second maximum DA value does not exceed the DA TH value, reducing a supply voltage/clock frequency (V/F) corner used by the second processing core.

10. The method of any of clauses 1 through 9, wherein the multi-core processor is a multi-core processor of a system-on-a-chip (SoC) integrated circuit (IC) package of a portable computing device (PCD).

11. A system for performing thermal mitigation in a multi-core processor, comprising:

first and second digital activity (DA) sensors disposed in first and second processing cores, respectively, of the multi-core processor, configured to produce first and second sets of DA values, respectively; and a processing circuit configured to receive the first and second sets of DA values and to process the first and second sets of DA values to determine whether at least one of the DA values exceeds a DA threshold (TH) value, wherein if a determination is made that at least one of the DA values exceeds the DA TH value, the processing circuit is configured to reduce the digital activity of at least one processing stage of at least one of the first and second processing cores that is associated with the DA value that exceeded the DA TH value.

12. The system of clause 11, further comprising:

first and second temperature sensors disposed in first and second processing cores, respectively, of the multi-core processor, configured to produce first and second sets of temperature values, respectively; and the processing circuit being further configured to receive the first and second sets of temperature values and to process the first and second sets of temperature to determine whether one or more thermal mitigation steps need to be performed in at least one of the first processing core and the second processing core.

13. The system of clauses 11 or 12, wherein the processing circuit is configured to perform said processing the first and second sets of temperature values to determine whether one or more thermal mitigation steps need to be performed in at least one of the first processing core and the second processing core by:

prior to processing the first and second sets of DA values to determine whether at least one of the DA values exceeds the DA TH value:

comparing each temperature value to a first-order temperature TH value to determine whether any of the temperature values exceeds the first-order temperature TH value; and if a determination is made that at least one of the temperature values of the first set of temperature values exceeds the first-order temperature TH value, reducing a clock frequency of the first processing core, and if it is determined that at least one of the temperature values of the second set of temperature values exceeds the first-order temperature TH value, reducing a clock frequency of the second processing core.

14. The system of clause 13, wherein the processing circuit is further configured to perform said processing the first and second sets of temperature values to determine whether one or more thermal mitigation steps need to be performed in at least one of the first processing core and the second processing core by:
prior to processing the first and second sets of DA values to determine whether at least one of the DA values exceeds a DA TH value:
if a determination is made that a temperature value compared to the first-order temperature TH value does not exceed the first-order temperature TH value, comparing the temperature value that did not exceed the first-order temperature TH value to a second-order temperature TH value that is less than the first-order temperature TH value.

15. The system of clause 14, wherein the processing circuit is further configured to perform the processing of the first and second sets of DA values to determine whether at least one of the DA values exceeds a DA TH value by:
aggregating the DA values and determining first and second maximum DA values of the first and second sets of DA values, respectively;
if the temperature value compared to the second-order temperature TH value is of the first set of temperature values and exceeds the second-order temperature TH value, comparing the first maximum DA value to a DA TH value;
if a determination is made that the first maximum DA value exceeds the DA TH value, reducing a digital activity of at least a first processing stage of the first processing core;
if the temperature value compared to the second-order temperature TH value is of the second set of temperature values and exceeds the second-order temperature TH value, comparing the second maximum DA value to the DA TH value; and
if a determination is made that the second maximum DA value exceeds the DA TH value, reducing the digital activity of at least a second processing stage of the second processing core.

16. The system of clauses 14 or 15, wherein the first processing stage of the first processing core is an execution unit (EU) processing stage, and wherein the digital activity of the EU processing stage is reduced by reducing a number of instructions per cycle (IPCs) that are executed by the EU processing stage.

17. The system of any of clauses 15 through 16, wherein the second processing stage of the second processing core is an execution unit (EU) processing stage, and wherein the digital activity of the EU processing stage is reduced by reducing a number of instructions per cycle (IPCs) that are executed by EU processing stage.

18. The system of any of clauses 15 through 17, wherein the processing circuit is further configured to:
if it is determined that the first maximum DA value does not exceed the DA TH value, reduce a supply voltage/clock frequency (V/F) corner used by the first processing core.

19. The system of any of clauses 15 through 18, wherein the processing circuit is further configured to:
if it is determined that the second maximum DA value does not exceed the DA TH value, reduce a supply voltage/clock frequency (V/F) corner used by the second processing core.

20. The system of any of clauses 11-19, wherein the multi-core processor is a multi-core processor of a system-on-a-chip (SoC) integrated circuit (IC) package of a portable computing device (PCD).

21. A computer-readable medium comprising computer instructions for execution by processing circuit of a multi-core processor for performing thermal mitigation in the multi-core processor, the computer instructions comprising:
a first set of computer instructions for receiving at least first and second sets of digital activity (DA) values produced by first and second DA sensors disposed in first and second processing cores, respectively, of the multi-core processor;
a second set of instructions for processing the first and second sets of DA values to determine whether at least one of the DA values exceeds a DA threshold (TH) value; and
a third set of computer instructions for execution by the processing circuit if a determination is made that at least one of the DA values exceeds the DA TH value, wherein execution by the third set of instructions reduces the digital activity of at least one processing stage of at least one of the first and second processing cores, said at least one processing stage being associated with said at least one of the DA value that exceeded the DA TH value.

22. The computer-readable medium of clause 21, further comprising:
a fourth set of computer instructions for receiving first and second sets of temperature values produced by first and second temperature sensors, respectively, disposed in first and second processing cores, respectively, of the multi-core processor; and
a fifth set of computer instructions for processing the first and second sets of temperature values to determine whether one or more thermal mitigation steps need to be performed in at least one of the first processing core and the second processing core.

23. The computer-readable medium of clause 22, wherein the fifth set of computer instructions are executed prior to execution of the third set of computer instructions and comprise:
computer instructions for comparing each temperature value to a first-order temperature TH value to determine whether any of the temperature values exceeds the first-order temperature TH value;
computer instructions for reducing a clock frequency of the first processing core if a determination is made that at least one of the temperature values of the first set of temperature values exceeds the first-order temperature TH value; and
computer instructions for reducing a clock frequency of the second processing core if it is determined that at least one of the temperature values of the second set of temperature values exceeds the first-order temperature TH value.

24. The computer-readable medium of clause 23, wherein the fifth set of computer instructions further comprises:
computer instructions for comparing a temperature value that did not exceed the first-order temperature TH value to a second-order temperature TH value that is less than the first-order temperature TH value.

25. The computer-readable medium of clause 24, wherein the third set of computer instructions comprises:

computer instructions for aggregating the DA values and determining first and second maximum DA values of the first and second sets of DA values, respectively;

computer instructions for comparing the first maximum DA value to a DA TH value if the temperature value compared to the second-order temperature TH value is of the first set of temperature values and exceeds the second-order temperature TH value;

computer instructions for reducing a digital activity of at least a first processing stage of the first processing core if a determination is made that the first maximum DA value exceeds the DA TH value;

computer instructions comparing the second maximum DA value to the DA TH value if the temperature value compared to the second-order temperature TH value is of the second set of temperature values and exceeds the second-order temperature TH value; and computer instructions for reducing the digital activity of at least a second processing stage of the second processing core if a determination is made that the second maximum DA value exceeds the DA TH value.

26. A system for performing thermal mitigation in the multi-core processor, the system comprising:

means for receiving at least first and second sets of digital activity (DA) values produced by first and second DA sensors disposed in first and second processing cores, respectively, of the multi-core processor;

means for processing the first and second sets of DA values to determine whether at least one of the DA values exceeds a DA threshold (TH) value; and means for reducing the digital activity of at least one processing stage of at least one of the first and second processing cores if a determination is made that at least one of the DA values exceeds the DA TH value, said at least one processing stage being associated with said at least one of the DA value that exceeded the DA TH value.

27. The system of clause 26, further comprising:

means for receiving first and second sets of temperature values produced by first and second temperature sensors, respectively, disposed in first and second processing cores, respectively, of the multi-core processor; and means for processing the first and second sets of temperature values to determine whether one or more thermal mitigation steps need to be performed in at least one of the first processing core and the second processing core.

28. The system of clause 27, wherein the means for processing the first and second sets of temperature values to determine whether one or more thermal mitigation steps need to be performed in at least one of the first processing core and the second processing core comprise:

means for comparing each temperature value to a first-order temperature TH value to determine whether any of the temperature values exceeds the first-order temperature TH value;

means for reducing a clock frequency of the first processing core if a determination is made that at least one of the temperature values of the first set of temperature values exceeds the first-order temperature TH value; and means for reducing a clock frequency of the second processing core if it is determined that at least one of the temperature values of the second set of temperature values exceeds the first-order temperature TH value.

29. The system of clause 28, wherein the means for processing the first and second sets of temperature values to determine whether one or more thermal mitigation steps need to be performed in at least one of the first processing core and the second processing core further comprise:

means for comparing a temperature value that did not exceed the first-order temperature TH value to a second-order temperature TH value that is less than the first-order temperature TH value.

30. The system of any of clause 29, wherein the means for processing the first and second sets of DA values to determine whether at least one of the DA values exceeds a DA TH value and the means for reducing the digital activity of at least one processing stage of at least one of the first and second processing cores comprise:

means for aggregating the DA values and for determining first and second maximum DA values of the first and second sets of DA values, respectively;

means for comparing the first maximum DA value to a DA TH value if the temperature value compared to the second-order temperature TH value is of the first set of temperature values and exceeds the second-order temperature TH value;

means computer instructions for reducing a digital activity of at least a first processing stage of the first processing core if a determination is made that the first maximum DA value exceeds the DA TH value;

means for comparing the second maximum DA value to the DA TH value if the temperature value compared to the second-order temperature TH value is of the second set of temperature values and exceeds the second-order temperature TH value; and means for reducing the digital activity of at least a second processing stage of the second processing core if a determination is made that the second maximum DA value exceeds the DA TH value.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for performing thermal mitigation in a multi-core processor, comprising:

with at least first and second digital activity (DA) sensors disposed in first and second processing cores, respectively, of the multi-core processor, producing first and second sets of DA values, respectively;

with first and second temperature sensors disposed in the first and second processing cores, respectively, of the multi-core processor, producing first and second sets of temperature values, respectively;

in a processing circuit, receiving the first and second sets of temperature values and processing the first and second sets of temperature values to determine whether one or more thermal mitigation steps need to be performed in at least one of the first processing core and the second processing core;

comparing each temperature value to a first-order temperature threshold (TH) value to determine whether any of the temperature values exceeds the first-order temperature TH value;

reducing a clock frequency of the first processing core in response to at least one of the temperature values of the first set of temperature values exceeds the first-order temperature TH value, and reducing a clock frequency of the second processing core in response to at least one of the temperature values of the second set of temperature values exceeds the first-order temperature TH value;

in the processing circuit, receiving the first and second sets of DA values;

in the processing circuit, aggregating the DA values and determining first and second maximum DA values of the first and second sets of DA values, respectively;

in the processing circuit, processing the first and second sets of DA values to determine whether at least one of the DA values exceeds a DA threshold (TH) value, wherein if a determination is made that at least one of the DA values exceeds the DA TH value, reducing the digital activity of at least one processing stage of one of the first and second processing cores that is associated with the DA value that exceeded the DA TH value;

in the processing circuit, prior to processing the first and second sets of DA values to determine whether at least one of the DA values exceeds the DA TH value: if a determination is made that a temperature value compared to the first-order temperature TH value does not exceed the first-order temperature TH value, comparing the temperature value that did not exceed the first-order temperature TH value to a second-order temperature TH value that is less than the first-order temperature TH value;

if the temperature value compared to the second-order temperature TH value is of the first set of temperature values and exceeds the second-order temperature TH value, comparing the first maximum DA value to the DA TH value; and if a determination is made that the first maximum DA value exceeds the DA TH value, reducing a digital activity of at least a first processing stage of the first processing core.

2. The method of claim 1, wherein the processing of the first and second sets of DA values to determine whether at least one of the DA values exceeds the DA TH value comprises:

if the temperature value compared to the second-order temperature TH value is of the second set of temperature values and exceeds the second-order temperature TH value, comparing the second maximum DA value to the DA TH value; and if a determination is made that the second maximum DA value exceeds the DA TH value, reducing the digital activity of at least a second processing stage of the second processing core.

3. The method of claim 2, wherein the first processing stage of the first processing core is an execution unit (EU) processing stage, and wherein the digital activity of the EU processing stage is reduced by reducing a number of instructions per cycle (IPCs) that are executed by the EU processing stage.

4. The method of claim 2, wherein the second processing stage of the second processing core is an execution unit (EU) processing stage, and wherein the digital activity of the EU processing stage is reduced by reducing a number of instructions per cycle (IPCs) that are executed by EU processing stage.

5. The method of claim 2, further comprising:

if it is determined that the first maximum DA value does not exceed the DA TH value, reducing a supply voltage/clock frequency (V/F) corner used by the first processing core.

6. The method of claim 5, further comprising:

if it is determined that the second maximum DA value does not exceed the DA TH value, reducing a supply voltage/clock frequency (V/F) corner used by the second processing core.

7. The method of claim 1, wherein the multi-core processor is a multi-core processor of a system-on-a-chip (SoC) integrated circuit (IC) package of a portable computing device (PCD).

8. A system for performing thermal mitigation in a multi-core processor, comprising:

first and second digital activity (DA) sensors disposed in first and second processing cores, respectively, of the multi-core processor, configured to produce first and second sets of DA values, respectively;

first and second temperature sensors disposed in the first and second processing cores, respectively, of the multi-core processor, configured to produce first and second sets of temperature values, respectively;

a processing circuit configured to receive the first and second sets of temperature values and configured to process the first and second sets of temperature values to determine whether one or more thermal mitigation steps need to be performed in at least one of the first processing core and the second processing core;

the processing circuit configured to compare each temperature value to a first-order temperature threshold (TH) value to determine whether any of the temperature values exceeds the first-order temperature TH value;

the processing circuit reducing a clock frequency of the first processing core in response to at least one of the temperature values of the first set of temperature values exceeds the first-order temperature TH value, and the processing circuit reducing a clock frequency of the second processing core in response to at least one of the temperature values of the second set of temperature values exceeds the first-order temperature TH value;

the processing circuit configured to receive the first and second sets of DA values;

the processing circuit aggregating the DA values and determining first and second maximum DA values of the first and second sets of DA values, respectively; and the processing circuit processing the first and second sets of DA values to determine whether at least one of the DA values exceeds a DA threshold (TH) value, wherein if a determination is made by the processing circuit that at least one of the DA values exceeds the DA TH value, the processing circuit is configured to reduce the digital activity of at least one processing stage of at least one of the first and second processing cores that is associated with the DA value that exceeded the DA TH value;

the processing circuit prior to processing the first and second sets of DA values to determine whether at least one of the DA values exceeds a DA TH value:

if a determination is made that a temperature value compared to the first-order temperature TH value does not exceed the first-order temperature TH value, comparing the temperature value that did not exceed the first-order temperature TH value to a second-order temperature TH value that is less than the first-order temperature TH value;

if the temperature value compared to the second-order temperature TH value is of the first set of temperature values and exceeds the second-order temperature TH value, comparing the first maximum DA value to the DA TH value; and if a determination is made that the first maximum DA value exceeds the DA TH value, reducing a digital activity of at least a first processing stage of the first processing core.

9. The system of claim 8, wherein the processing circuit is further configured to perform the processing of the first and second sets of DA values to determine whether at least one of the DA values exceeds a DA TH value by:
   determining if the temperature value compared to the second-order temperature TH value is of the second set of temperature values and exceeds the second-order temperature TH value, comparing the second maximum DA value to the DA TH value; and
   if a determination is made that the second maximum DA value exceeds the DA TH value, reducing the digital activity of at least a second processing stage of the second processing core.

10. The system of claim 9, wherein the first processing stage of the first processing core is an execution unit (EU) processing stage, and wherein the digital activity of the EU processing stage is reduced by reducing a number of instructions per cycle (IPCs) that are executed by the EU processing stage.

11. The system of claim 9, wherein the second processing stage of the second processing core is an execution unit (EU) processing stage, and wherein the digital activity of the EU processing stage is reduced by reducing a number of instructions per cycle (IPCs) that are executed by EU processing stage.

12. The system of claim 9, wherein the processing circuit is further configured to:
    reduce a supply voltage/clock frequency (V/F) corner used by the first processing core if it is determined that the first maximum DA value does not exceed the DA TH value.

13. The system of claim 12, wherein the processing circuit is further configured to:
    reduce a supply voltage/clock frequency (V/F) corner used by the second processing core if it is determined that the second maximum DA value does not exceed the DA TH value.

14. The system of claim 8, wherein the multi-core processor is a multi-core processor of a system-on-a-chip (SoC) integrated circuit (IC) package of a portable computing device (PCD).

15. A non-transitory computer-readable medium comprising computer instructions for execution by a processing circuit of a multi-core processor for performing thermal mitigation in the multi-core processor, the computer instructions comprising:
    a first set of computer instructions for receiving at least first and second sets of digital activity (DA) values produced by first and second DA sensors disposed in first and second processing cores, respectively, of the multi-core processor;
    a second set of computer instructions for receiving first and second sets of temperature values produced by first and second temperature sensors, respectively, disposed in the first and second processing cores, respectively, of the multi-core processor;
    a third set of computer instructions for processing the first and second sets of temperature values to determine whether one or more thermal mitigation steps need to be performed in at least one of the first processing core and the second processing core;
    a fourth set of computer instructions for comparing each temperature value to a first-order temperature threshold (TH) value to determine whether any of the temperature values exceeds the first-order temperature TH value;
    a fifth set of computer instructions for reducing a clock frequency of the first processing core in response to at least one of the temperature values of the first set of temperature values exceeds the first-order temperature TH value;
    a sixth set of computer instructions for reducing a clock frequency of the second processing core in response to at least one of the temperature values of the second set of temperature values exceeds the first-order temperature TH value;
    a seventh set of computer instructions for aggregating the DA values and determining first and second maximum DA values of the first and second sets of DA values, respectively;
    an eighth set of instructions for processing the first and second sets of DA values to determine whether at least one of the DA values exceeds a DA threshold (TH) value; and
    a ninth set of computer instructions for execution by the processing circuit if a determination is made that at least one of the DA values exceeds the DA TH value, wherein execution by the third set of instructions reduces the digital activity of at least one processing stage of at least one of the first and second processing cores, said at least one processing stage being associated with said at least one of the DA values that exceeded the DA TH value;
    a tenth set of computer instructions for comparing a temperature value that did not exceed the first-order temperature TH value to a second-order temperature TH value that is less than the first-order temperature TH value;
    an eleventh set of computer instructions for comparing the first maximum DA value to the DA TH value if the temperature value compared to the second-order temperature TH value is of the first set of temperature values and exceeds the second-order temperature TH value; and
    a twelfth set of computer instructions for reducing a digital activity of at least a first processing stage of the first processing core if a determination is made that the first maximum DA value exceeds the DA TH value.

16. The computer-readable medium of claim 15, wherein the twelfth set of computer instructions further comprises:
    computer instructions comparing the second maximum DA value to the DA TH value if the temperature value compared to the second-order temperature TH value is of the second set of temperature values and exceeds the second-order temperature TH value; and
    computer instructions for reducing the digital activity of at least a second processing stage of the second processing core if a determination is made that the second maximum DA value exceeds the DA TH value.

* * * * *